United States Patent [19]

Takamiya et al.

[11] Patent Number: 5,045,037
[45] Date of Patent: Sep. 3, 1991

[54] FRICTION STEPLESS SPEED CHANGE DEVICE

[75] Inventors: Kikuzo Takamiya, Kitamoto; Yoshitaka Tamura, Saitama; Kiyofumi Hirai, Ageo, all of Japan

[73] Assignee: Bridgestone Cycle Co., Ltd., Tokyo, Japan

[21] Appl. No.: 544,618

[22] Filed: Jun. 27, 1990

[30] Foreign Application Priority Data

Jun. 27, 1989 [JP] Japan .................................. 1-162704

[51] Int. Cl.$^5$ ............................................. F16H 37/00
[52] U.S. Cl. ...................................................... 475/215
[58] Field of Search ......................................... 475/215

[56] References Cited

U.S. PATENT DOCUMENTS

| 1,963,599 | 6/1934 | Tscherne | 475/215 X |
| 2,583,496 | 1/1952 | Rougelot | 475/215 X |

FOREIGN PATENT DOCUMENTS

| 519879 | 12/1955 | Canada | 475/215 |
| 74328 | 12/1944 | Czechoslovakia | 475/215 |
| 1118800 | 6/1956 | France | 475/215 |
| 16-5765 | 3/1941 | Japan . | |
| 46-34919 | 12/1971 | Japan . | |
| 46-42249 | 12/1971 | Japan . | |
| 49-29168 | 8/1974 | Japan . | |

Primary Examiner—Allan D. Herrmann
Assistant Examiner—Ryan W. Massey
Attorney, Agent, or Firm—Parkhurst, Wendel & Rossi

[57] ABSTRACT

A friction stepless speed change device includes an input shaft, a driven shaft and an output shaft arranged on a common axis, and a countershaft rotatably provided in parallel with the common axis. The device further includes tow rockable arms rockable about the countershaft, a cylindrical driving rotary assembly rotatably provided on free ends of the rockable arms to enclose the driven shaft, a set of driving friction discs rotating together with the driving rotary assembly, and a set of driven friction discs rotating together with the driven shaft. The countershaft includes a first gear in mesh with a gear fixed to the input shaft, a second gear in mesh with a gear fixed to the driving rotary assembly, and a third gear in mesh with a sun gear of a planetary gear provided on the driven shaft. The output shaft is integrally formed with an internal gear in mesh with planet gears of the planetary gear.

1 Claim, 6 Drawing Sheets

FIG_2

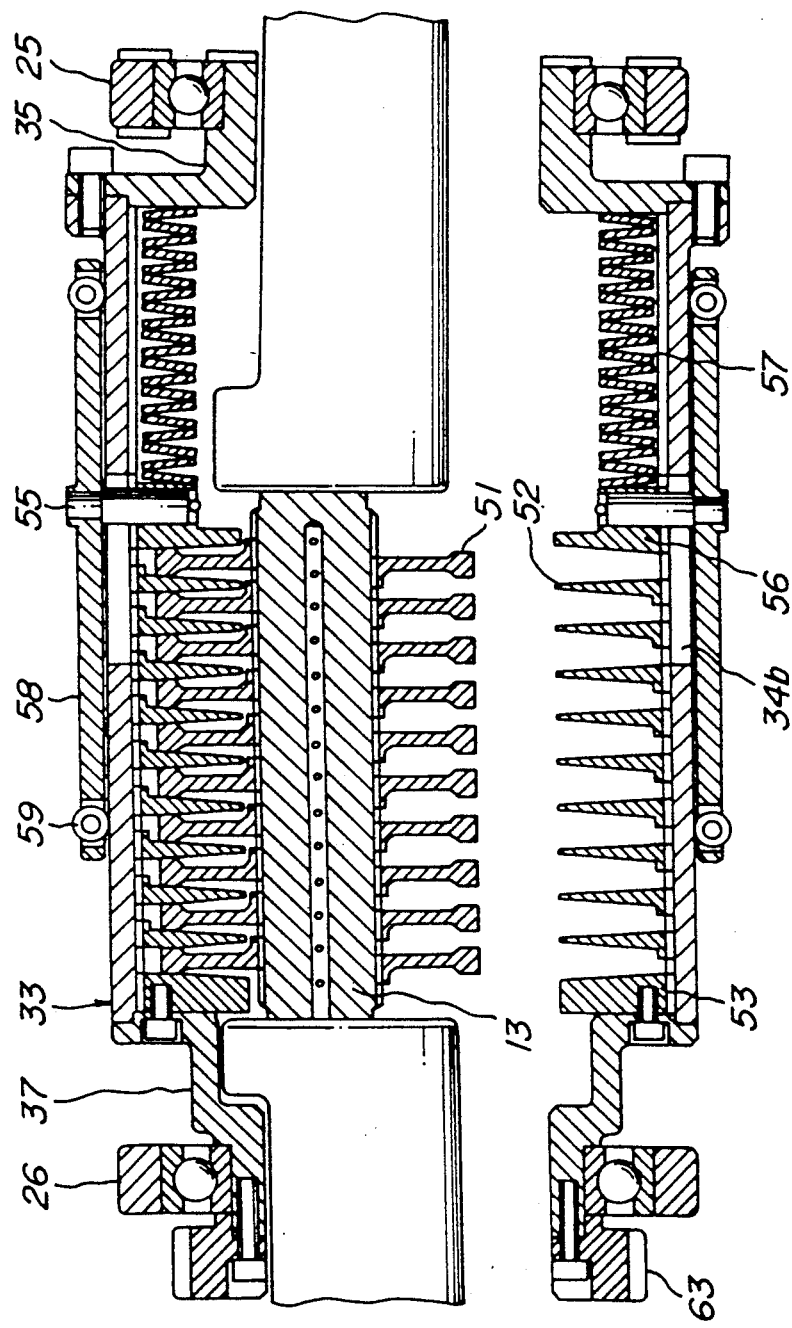

FIG_6
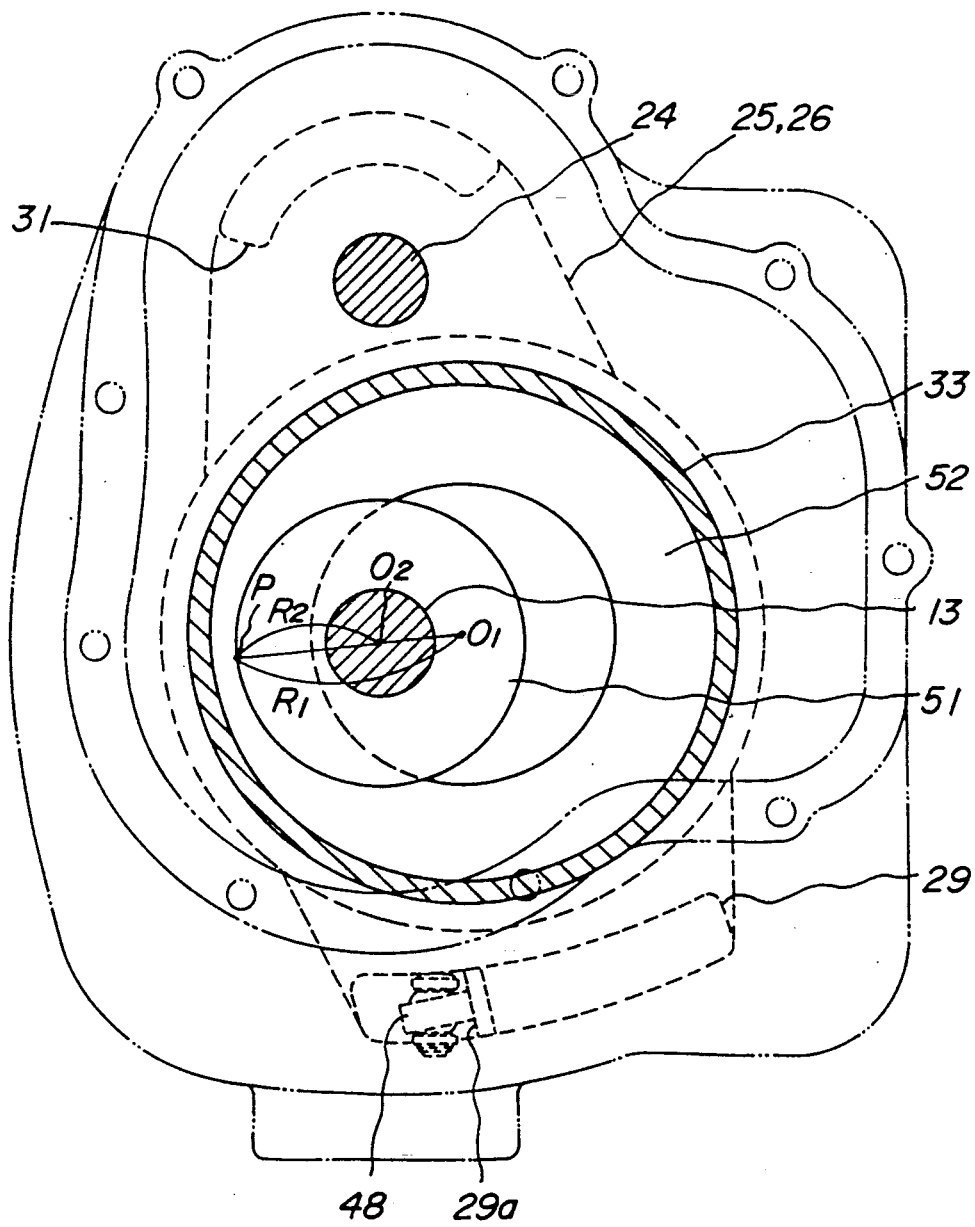

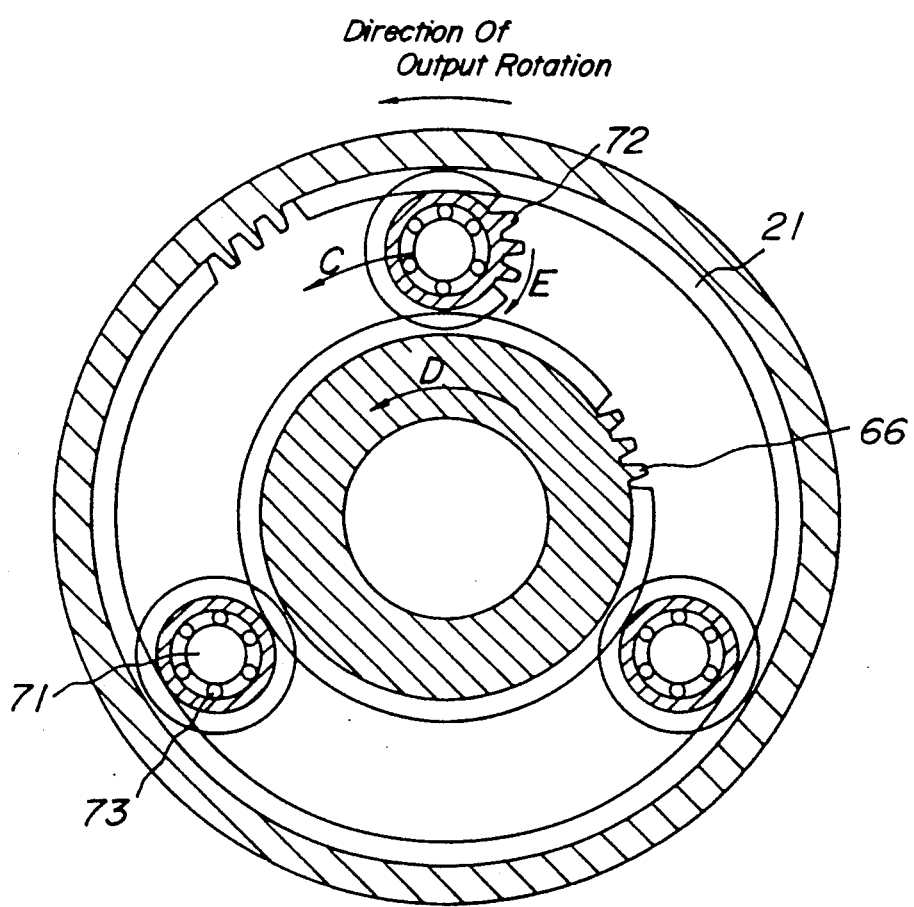
FIG_7

FRICTION STEPLESS SPEED CHANGE DEVICE

BACKGROUND OF THE INVENTION

This invention relates to a friction stepless speed change device for general purpose being suitable for use in industrial machines, automobiles, other vehicles and the like.

The friction stepless speed change devices concerning with the invention are classified into cone, disc, ring and spherical surface transmissions.

With any of the friction stepless speed change devices above described, the stepless speed change transmission is effected by changing rotating radii of friction transmission contact points in a stepless manner. The friction transmission contact points are divided into two kinds of external and internal contact types.

The external contact types are disclosed, for example, in Japanese Utility Model Application Publication No. 49-29,168 and Japanese Patent Application Publication No. 46-42,249. On the other hand, the internal contact types are disclosed, for example, in Japanese Utility Model Application Publication No. 46-34,919 and Japanese Patent Application Publication No. 41-5,765.

In the external contact type, the transmission is accomplished by contact between two convex surfaces, whose contact surfaces are wide, belt-like surfaces along contact orbits corresponding to pitch lines due to contact pressures.

As a result, positive and negative slips occur on outer and inner sides of the contact orbit so that such slips result in internal friction losses which lower the transmission efficiency.

Moreover, the case of which either the driving or driven side has a small curvature rotor, when the difference in rotating radii of the driving and driven sides becomes large, the above positive and negative slips rapidly increase. As a result, the transmission efficiency is lowered further.

Therefore, the friction stepless speed change device of the external contact type has a disadvantage in that the transmission efficiency is low due to the external contact.

On the other hand, with the device of the internal contact type, the transmission is effected by contact between a concave surface and a convex surface. Contact orbits are narrow line-shaped surfaces.

Consequently, the device of the internal contact type is superior to the external contact type device in that it has, less internal friction losses and high transmission efficiency.

With the device of the internal contact type, however, any input and output shafts surrounding the other shaft and one shaft for supporting friction transmission members must be movable.

Accordingly, owing to the construction, it is difficult to support rigidly the shaft performing translational movements.

With the device of the internal contact type, moreover, the friction discs are in point contact only at one point and high contact pressure therebetween is required, with the result that the friction discs are apt to open out of a parallel position.

In other words, even with the internal contact type, it is difficult to maintain the friction discs in parallel with each other so that contact pressure becomes unstable. As a result, transmission of torque is obstructed and hence transmission efficiency lowers. This disadvantage is acute in multiple-friction disc construction.

SUMMARY OF THE INVENTION

It is an object of the invention to provide a friction stepless speed change device which eliminates all the disadvantages of the prior art above described and which accomplishes high transmission efficiency.

In order to accomplish the object, the friction stepless speed change device according to the invention comprises an input shaft, a driven shaft and an output shaft rotatably arranged on a common axis. A countershaft rotatably is provided in parallel with the common axis and, two rocking arms rockable about the countershaft. A cylindrical driving rotary assembly rotatably is provided on free ends of the rockable arms to enclose the driven shaft. A set of driving friction discs are provided to rotate together with the driving rotary assembly and a set of driven friction discs are provided rotating together with the driven shaft. The driving and driven friction discs are wedge-engaged with each other. A first gear is fixed to the countershaft and is in mesh with a gear fixed to the input shaft, a second gear is fixed to the countershaft and is in mesh with a gear fixed to the driving rotary assembly, and a third gear is fixed to the countershaft and is in mesh with a sun gear rotatably provided on the common axis. Planet gears journaled on a planetary carrier are fixed to the driven shaft and are in mesh with the sun gear, and an internal gear is integrally provided on the output shaft and is in mesh with the planet gears.

As above described, according to the invention, the set of driving friction discs which are adjustable in eccentricity and the set of driven friction discs which rotate together with the driven shaft are wedge-engaged with each other in an internal contacting relation. On the other hand, under a low speed changed condition, the sets of the driving and driven friction discs are engaged with each other in a concentric relation. Therefore, under the low condition both the friction discs are engaged under pressure along their entire circumferences so that very high transmission efficiency, such as approximately 100%, can be accomplished.

Moreover, under speed changed conditions other than the low speed, the driven friction discs are eccentric relative to the driving friction discs so that both the friction discs are partially engaged. The contact in this case is an internal contact and difference in diameters of pitch lines at the friction transmission contact of both the friction discs is not very large. Consequently, the friction transmission contact lines extend as thin lines on the pitch lines so that the positive and negative slip zones positioned on both sides of the pitch lines are narrower than those in the prior art.

Therefore, even under speed changed zones other than the low speed, a fairly high transmission efficiency can be accomplished.

Namely, the friction stepless speed change device according to the invention exhibits in all speed changed zones very high transmission efficiency which could not be expected in the prior art.

Moreover, according to the invention the countershaft is provided in addition to the driven shaft, and the eccentricity is adjusted by the arm rockable about the countershaft. Therefore, the driven rotary assembly is supported at both ends so that the axis of the driving rotary assembly and the axis of the driven shaft are easily maintained in parallel with each other. Consequently, the friction stepless speed change device according to the invention exhibits high transmission efficiency, while the friction discs are easily maintained in parallel positions even if a number of friction discs are used in multilayers in order to transmit large torque.

The invention will be more fully understood by referring to the following detailed specification and claims taken in connection with the appended drawings.

BRIEF DESCRIPTION OF THE DRAWINGS

FIG. 5 is a sectional view illustrating the wedge-engagement of the respective friction discs when being eccentric;

FIG. 6 is a sectional view illustrating the wedge-engagement of the friction discs in a section perpendicular the driven shaft; and FIG. 7 is a sectional view of a planetary gears used in the device according to the invention.

DETAILED EXPLANATION OF THE PREFERRED EMBODIMENTS

Figure 1:
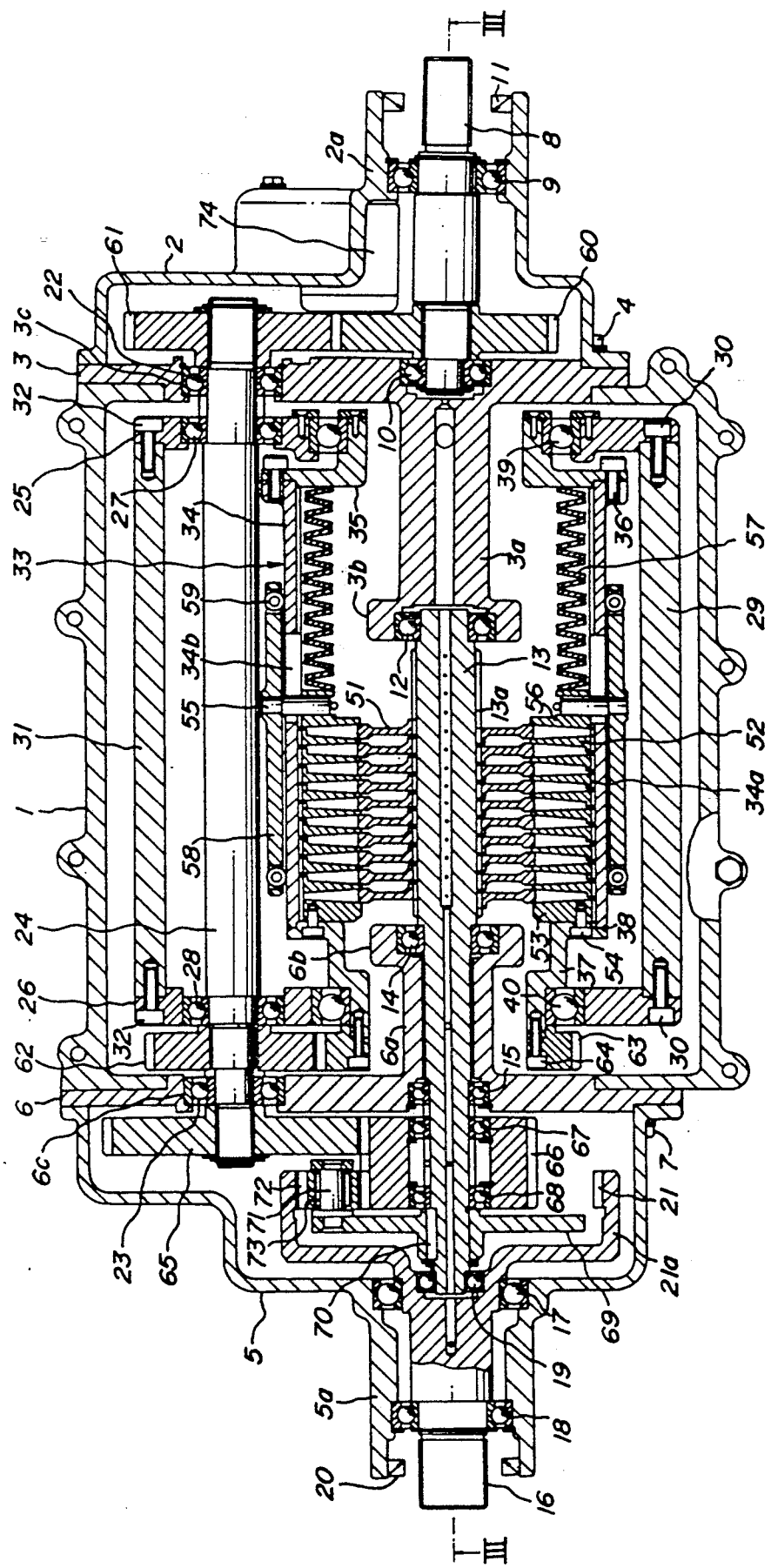
FIG. 1 is a longitudinal sectional view illustrating a device according to the invention.
Figure 2:
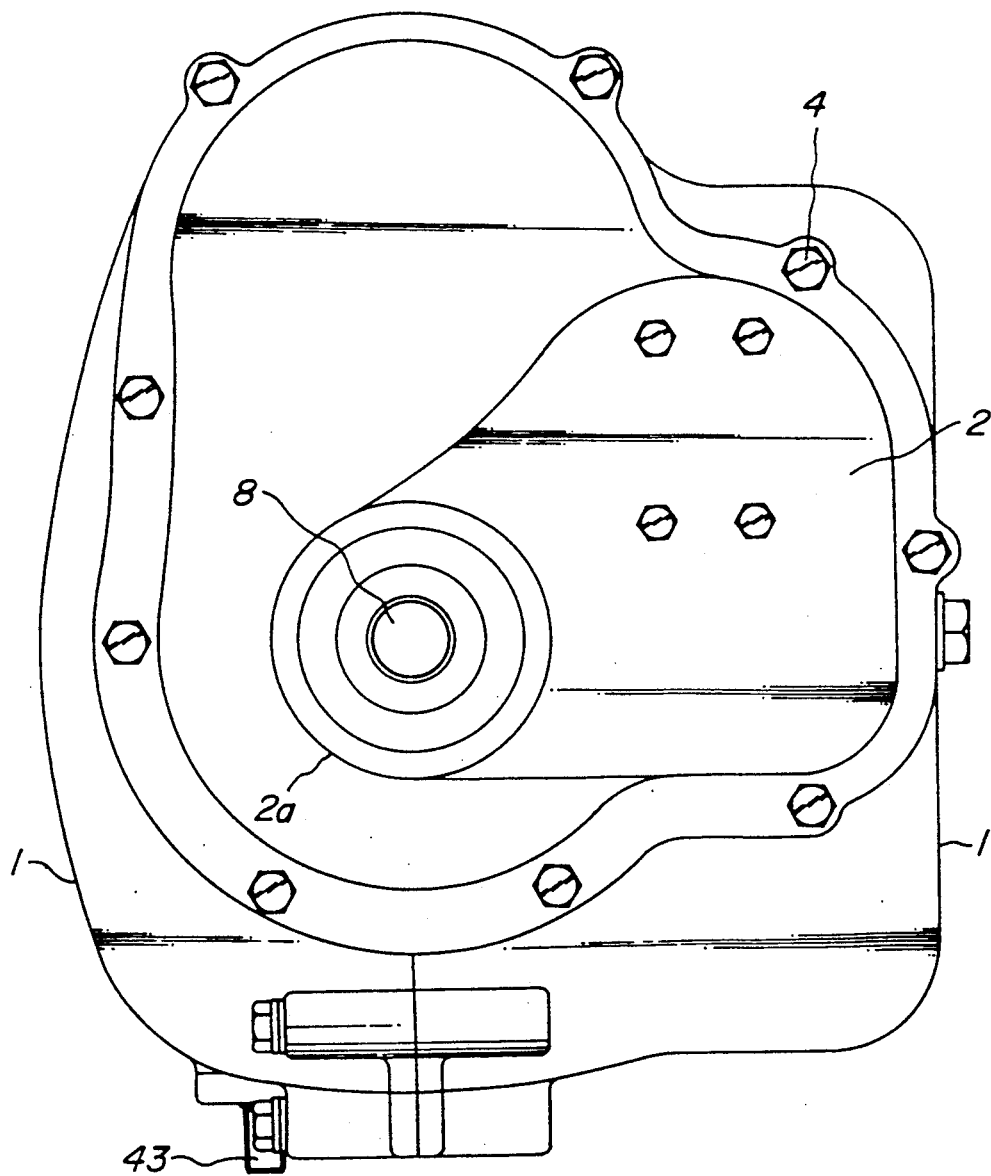
FIG. 2 is a front view of the device shown in FIG. 1 viewed from the input side.

Referring to FIGS. 1-7, one preferred embodiment of the device according to the invention will be explained.

The device comprises a hollow cylindrical main casing 1 having an input side casing 2 fixed to an input side end surface of the main casing 1 through an intermediate support 3 by means of bolts 4, and an output side casing 5 fixed to an output side end surface of the main casing 1 through an intermediate support 6 by means of bolts 7.

The input side casing 2 is formed with an outwardly extending boss 2a and the intermediate support 3 is formed with a hollow boss 3a extending into a center of the main casing 1 and having at its inner end an enlarged diameter bearing portion 3b.

The intermediate support 6 is formed with a hollow boss 6a extending into the center of the main casing 1 and having at its inner end an enlarged diameter bearing portion 6b.

Moreover, the output side casing 5 is formed with a hollow boss 5a extending outwardly.

An input shaft 8 is rotatably supported by a ball bearing 9 provided in the boss 2a of the input side casing 2 and a ball bearing 10 provided in the intermediate support 3. Reference numeral 11 denotes an oil seal.

A driven shaft 13 is supported at one end by a ball bearing 12 provided in the bearing portion 3b of the intermediate support 3 and rotatably extends through the hollow boss 6a of the intermediate support 6. A ball bearing 14 is provided in the bearing portion 6b and a ball bearing 15 is provided in a bottom of the hollow boss 6a for rotatably supporting the driven shaft 13.

An output shaft 16 extends through the boss 5a of the output side casing 5 and is rotatably supported by ball bearings 17 and 18 provided in the boss 5a. A ball bearing 19 is provided at an overlapping portion of the driven shaft 13 and the output shaft 16, while an oil seal 20 is provided at an outward end of the boss 5a. The input shaft 8, the driven shaft 13 and the output shaft 16 are coaxially rotatably arranged.

The output shaft 16 is formed at an inner end with a hollow cylinder portion 21a which is integrally formed in its inside with an internal gear 21.

Above the intermediate supports 3 and 6 are provided bearing portions 3c and 6c in which ball bearings 22 and 23 are provided. A countershaft 24 is supported by the ball bearings 22 and 23 and in parallel with the input shaft 8 and the driven shaft 13. Rocking arms 25 and 26 are rockably journaled with their bottoms in bearings 27 and 28 by the countershaft 24 on both sides in the main casing 1.

The rocking arms 25 and 26 are connected to each other at their free ends through a connecting plate 29 by means of bolts 30 and at their other ends through a connecting plate 31 by means of bolts 32.

FIG. 6 illustrates shapes of the rocking arms 25 and 26 in phantom lines in plan view. The shapes of the arms are of circular plates having protrusions on both sides. The upper protrusions are journaled by the countershaft 24 and connected to each other by the connecting plate 31, while free ends of the lower protrusions are connected to each other by the connecting plate 29. The hollow bosses 3a and 6a and the driven shaft 13 are positioned in a space formed by the circular plates.

A driving rotary assembly 33 comprises a hollow cylindrical member 34, an annular bearing shell 35 joined to one end of the hollow cylindrical member 34 by means of bolts 36, and a stepped cylindrical bearing shell 34 fixed to the other end of the hollow cylindrical member 34 by means of welding 38.

The driving rotary assembly 33 is arranged to enclose the hollow bosses 3a and 6a and the driven shaft 13 in the main casing 1. The bearing shell 35 is journaled in a ball bearing 39 provided in the rocking arm 25, while the bearing shell 37 is journaled in a ball bearing 40 in the rocking arm 26 in a manner that when the rocking arms 25 and 26 are in positions shown in FIG. 1, an axis of the driving rotary assembly 33 is concentric to an axis of the driven shaft 13.

Figure 3:
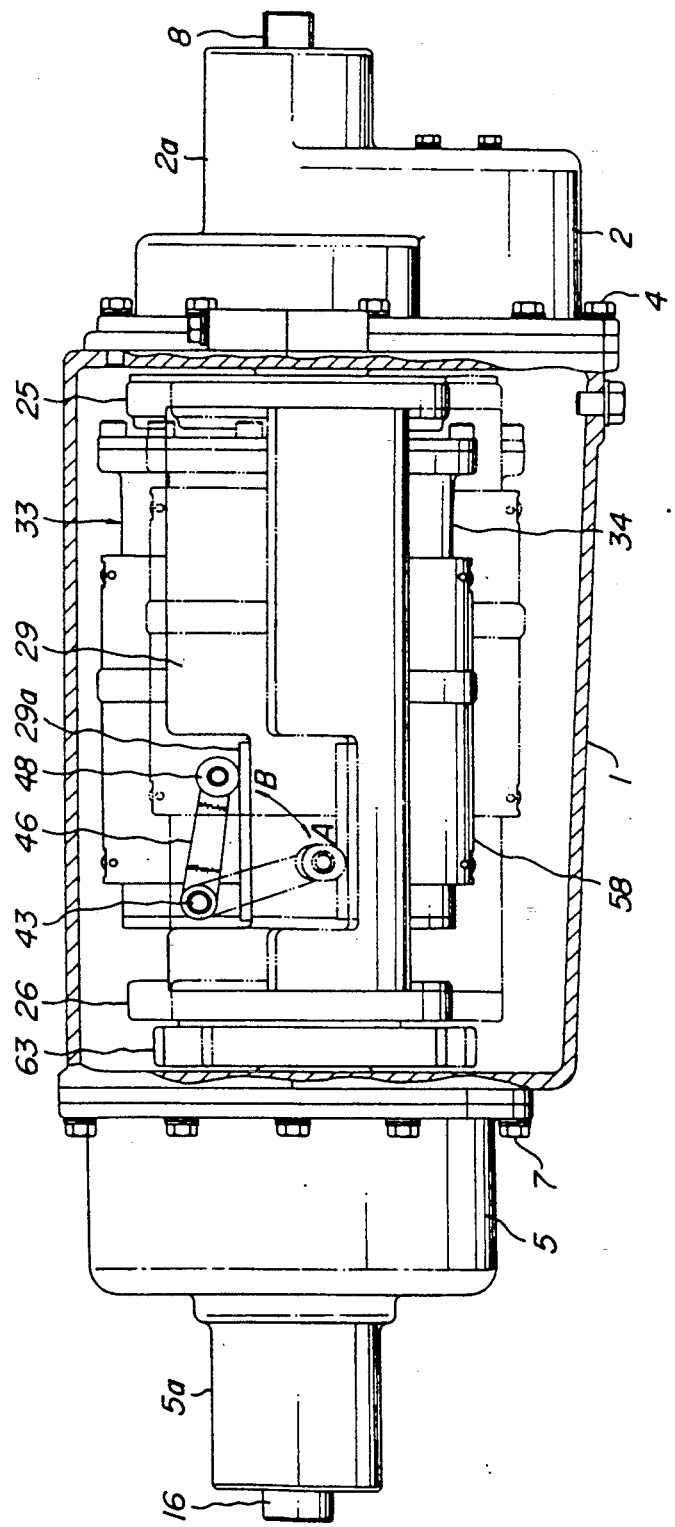
FIG. 3 is a sectional view of the device taken along the line III—III in FIG. 1.
Figure 4:
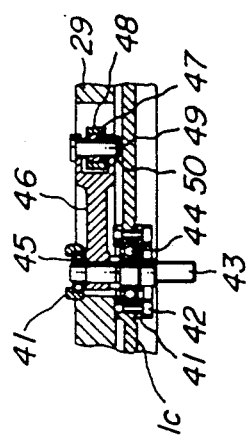
FIG. 4 is a partial sectional view of the eccentricity operating means used in the device shown in FIG. 1.

In order to provide positioning means for the rocking arms 25 and 26, the main casing 1 is formed at a bottom surface with a bearing seat 1c (FIG. 4) to which is fixed a bearing holder 41 by means of bolts 42, and an operating shaft 43 is rotatably journaled in ball bearings 44 and 45 in the bearing holder 41 as shown in FIGS. 3, 4 and 6.

An operating arm 46 is fixed with its bottom to the operating shaft 43 and formed at its free end with a yoke in which a roller 48 is journaled through a spherical bearing 47 by a pin 49 fixed to the yoke by means of a snap ring 50. The roller 48 is in contact with an abutment plate 29a fixed to a recess formed in the connecting plate 29.

Consequently, when the operating shaft 43 is operated to rotate the operating arm 46 as shown by arrows A and B (FIG. 3), the driving rotary assembly 33 is driven through the connecting plate 29 and the rocking arms 25 and 26 from the concentric position shown in FIG. 1 to the maximum eccentric position shown in FIGS. 5 and 6.

The driven shaft 13 is formed in an outer circumference with spline grooves 13a, on which a number (ten in this embodiment) of circular ring-shaped driven friction discs 51 are fitted by means of the spline grooves 13a.

Moreover, the hollow cylindrical member 34 of the driving rotary assembly 33 is also formed in an inner circumference with spline grooves 34a, on which a number (nine in this embodiment) of circular ring-shaped driving friction discs 52 are fitted by means of the spline grooves 34a. Each of the driving friction discs 52 has a wedge-shaped longitudinal section which is thicker at an outer circumference and thinner at an inner circumference as shown in FIG. 1.

On the output side of the set of driving friction discs 52 there is provided a stationary friction disc 53 having an oblique surface inclined symmetrically to an opposed surface of the adjacent driving friction disc 52. The stationary friction disc 53 is fixed to a wall surface of the bearing shell 37 perpendicular to the driven shaft 13 by means of bolts 54.

On the other hand, on an input side of the set of driving friction discs 52 there is provided an urging friction disc 56 having an oblique surface inclined symmetrically to an opposed surface of the adjacent driving friction disc 52. The urging friction disc 56 has on the input side connecting pins 55 fitted therein which extend through the hollow cylindrical member 34. The urging friction disc 56 is slidably fitted in the hollow cylindrical member 34 by means of a spline connection. The hollow cylindrical member 34 is formed with elongated apertures 34b along its generators through which the connecting pins 55 extend outwardly. A number (twenty in this embodiment) of dish-shaped springs 57 are provided in series between the urging friction disc 56 and the bearing shell 35.

A slide cylinder 58 is provided slidably on the hollow cylindrical member 34 through rollers 59 which are provided at both ends of the slide cylinder 58 at six positions equally spaced on the circumference of the slide cylinder 58.

Outer ends of the connecting pins 55 are firmly fitted in the slide cylinder 58.

The urging friction disc 56 is slidably fitted in the inner circumference of the hollow cylindrical member 34 through connecting pins 55 firmly fixed to the slide cylinder 58 slidably fitted on the hollow cylindrical member 34 through the rollers 59 without wobbling. Therefore, there is no risk of the urging friction disc 56 to incline or deflect from a parallel position.

A gear 60 is fixed to the input shaft 8 in the input side casing 2, while a first gear 61 is fixed to the countershaft 24 in the input side casing 2 so as to in mesh with the gear 60.

A second gear 62 is fixed to the countershaft 24 between the intermediate support 6 and the rocking arm 26, while a gear 63 is fixed to the bearing shell 37 of the driving rotary assembly 33 by means of bolts 64 so as to be in mesh with the second gear 62.

A third gear 65 is fixed to the countershaft 24 in the output side casing 5, while a sun gear 66 is rotatably provided on the driven shaft 13 through ball bearings 67 and 68 to be in mesh with the third gear 65. A planetary carrier 69 in the form of a disc is fixed to the driven shaft 13 by means of a key 70. The planetary carrier 69 is provided with a plurality (three in this embodiment as shown in FIG. 7) of shafts 71 extending therefrom. A plurality of planet gears 72 are rotatably provided on the shafts 71 through needle bearings 73 so as to be in mesh with the sun gear 66. Reference numeral 74 denotes an oil pump provided in the input side casing 2 for lubricating.

The operation of the device constructed as above described according to the invention will be explained.

FIG. 1 illustrates the driving rotary assembly 33 whose axis is concentric to that of the driven shaft 13. In this condition, the roller 48 abuts against the abutting plate 29a of the connecting plate 29 as shown in FIG. 3.

When the operating shaft 43 is rotated to rotate the roller 48 in the direction shown in the arrow A in FIG. 3, the connecting plate 29 is displaced into the position shown in the phantom lines. Consequently, the rocking arms 25 and 26 ar rotated about the countershaft 24 so that the driving rotary assembly 33 is rotated about the countershaft 24 toward the right viewed in FIG. 6. As a result, the axis of the driving rotary assembly 33 becomes eccentric to the driven shaft 13.

FIG. 5 illustrates such an eccentric condition in section. As shown in FIG. 5, the sets of the driven and driving friction discs 51 and 52 are constantly subjected to forces driving these discs into the concentric positions because of the dish-shaped springs 57 pressing the set of the driving friction discs 52 and the inclined surfaces of the driving friction discs 52.

Therefore, when the operating shaft 43 is rotated in the reverse direction, the roller 48 is rotated in the direction of the arrow B from the position shown in the phantom lines in FIG. 3 to the original position with the aid of the forces driving the discs to the concentric positions.

In other words, by rotating the operating shaft 43, the driving rotary assembly 33 can be brought from the concentric position into any eccentric positions relative to the driven shaft 13.

In the concentric position shown in FIG. 1, the sets of the driving and driven friction discs 52 and 51 are in contact with each other over their entire circumferences and forced against each other by the dish-shaped springs 57. Consequently, the sets of the driving and driven friction discs 52 and 51 are rotated in unison without any slippage.

Therefore, under this condition, if the input shaft 8 is rotated, the rotation of the input shaft 8 is transmitted to the countershaft 24 through the gear 60 and the first gear 61 in mesh with each other and further transmitted to the driving rotary assembly 33 through the second gear 62 and the gear 63 in mesh with each other. As a result, the driven shaft 13 and the driving rotary assembly 33 are rotated in unison so that the planetary carrier 69 integrally connected with the driven shaft 13 is rotated in the direction shown by the arrow C in FIG. 7. Moreover, the rotation of the countershaft 24 causes the sun gear 66 of the planetary gear assembly in mesh with the third gear 65 to rotate in the direction of the arrow D in FIG. 7.

In this case, the sun gear 66 is rotated at a higher speed than that of the planetary carrier dependent upon a gear ratio so that the respective planet gears 72 are revolved about the sun gear 66 in the direction of the arrow C and at the same time rotated about their axes in the directions of the arrow E. Therefore, the output shaft 16 integrally connected to the internal gear 21 in mesh with the planet gears 72 is rotated at a slower speed than that of the planetary carrier 69 and hence the driven shaft 13 rotating in the direction of the arrow C.

In this embodiment, gear ratios are set such that when the input shaft 8 is rotated one rotation, the sun gear 66 is rotated about 1.6 rotation and the driven shaft 13 is rotated about 0.7 rotation. In other words, the sun gear 66 is rotated faster by 0.9 than the driven shaft 13.

An amplification factor in this embodiment is approximately 1.58. Therefore, the rotation of the output shaft 16 at a minimum speed (low) delays by 1.58 times difference in rotation (1.6−0.7=0.9). As 0.9×1.58=1.42 and 1.6−1.42=0.18, when the input shaft is rotated one rotation, the output shaft is rotated 0.18 rotation under a so called "low" speed changed condition of the stepless speed change device in this embodiment of the invention.

When the operating shaft 43 is rotated in the direction of the arrow A in FIG. 3 to bring the operating arm 46 into the position shown in the phantom lines, the driving rotary assembly 33 moves through the rocking arms 25 and 26 into the eccentric position shown in FIGS. 5 and 6. That is to say, the axis of the driving rotary assembly 33 is eccentric relative to the driven shaft 13.

In this case, contact portions of the driving and driven friction discs 52 and 51 are only in the proximity of a point P shown in FIG. 6. Under this condition, if the input shaft 8 is rotated, the driving rotary assembly 33 is also rotated. However, there is a difference between rotating radii of the sets of the driving and driven friction discs 52 and 51.

In more detail, referring to FIG. 6, $R_1 > R_2$, where a radius $R_1$ is a distance between the point P and a center $O_1$ of set of the driving friction discs 52 and a radius $R_2$ is a distance between the point P and a center $O_2$ of set of the driven friction discs 51. Therefore, the driven friction discs 51 are rotated at a speed faster than that of the set of the driving friction discs 52. In this embodiment, the speed increase ratio is of the order of 1:1.53.

The stepless speed change device of this embodiment is so set that when the input shaft 8 is rotated one rotation under the condition shown in FIG. 1, the sun gear 66 is rotated about 1.6 rotation and the driven shaft 13 is rotated about 0.7 rotation. Moreover, under the speed changed condition shown in FIGS. 5 and 6, the rotation of the driving shaft is increased 1.53 times. Therefore, the driven shaft is rotated 0.7×1.53=1.07 rotation when the driving shaft is rotated one rotation.

An amplification factor in this embodiment is approximately 1.58. Therefore, the rotation of the output shaft 16 at the maximum speed (top) delays by 1.58 times difference in rotation (1.6−1.07=0.58).

Namely, as 0.53×1.58=0.84 and 1.6−0.84=0.76, the rotation of the output shaft 16 in the top speed changed condition is 0.76, when the input shaft 8 is rotated one rotation. When the operating shaft 43 is set at any position between the heads of the arrows A and B, any transmission ratio can be obtained between the top and low in a stepless manner.

If required, by enlarging the speed reduction ratio or the amplification factor, the output shaft 16 can be rotated in reverse direction relative to the input shaft 8.

As can be seen from the above explanation, the discs are used for the friction transmission in the device according to the invention. In other words, the set of the driving friction discs 52 adjustable in eccentricity and the set of the driven friction discs 51 rotating together with the driven shaft 13 are brought into internal contact with each other by wedge-engagement.

Moreover, in the low speed changed condition the driving and driven friction discs 52 and 51 are in engagement with each other in the concentric position. Consequently, both the friction discs are engaged with each other under pressure with all the circumferences. It is, therefore, possible to accomplish very high transmission efficiency such as approximately 100% without any slippage.

In speed conditions other than the low, the set of the driven friction discs 51 is eccentric to the set of the driving friction discs 52 so that these friction discs are partially in contact with each other. The contact in this case is the internal contact and the difference in pitch line diameter at the friction transmission point P (FIG. 6) of the both friction discs is not very large. Accordingly, the contact lines of the friction transmission extend as thin lines on the pitch lines. Positive and negative slip zones on both sides of the pitch lines are narrower than those of the prior art. According to the invention, therefore, fairly high transmission efficiency can also be accomplished at speeds other than the low.

In other words, the friction stepless speed change device according to the invention exhibits in all speed zones high transmission efficiency which is not expected with the prior art devices. The device according to the invention is very high in utility value, particularly under a condition which transitionally requires stepless speed change and a low speed is normally used.

According to the invention, moreover, the countershaft 24 in addition to the driven shaft 13 is provided and the eccentricity between both the friction discs is adjusted by rotating amounts of the arms 25 and 26 rockable about the countershaft 24. With this arrangement, the driving rotary assembly 33 is supported at both ends so that the axes of the driving rotary assembly 33 and the driven shaft 13 are easily maintained in practical with each other.

Moreover, the device according to the invention can exhibit the high transmission efficiency, while respective discs are maintained in parallel positions even if a number of friction discs are used in multilayers for transmitting large torque.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A friction stepless speed change device comprising an input shaft, a driven shaft and an output shaft rotatably arranged on a common axis, a countershaft rotatably provided in parallel with the common axis, two rockable arms rockable about the countershaft, a cylindrical driving rotary assembly rotatably provided on free ends of the rockable arms to enclose the driven shaft, a set of driving friction discs rotating together with the driving rotary assembly, a set of driven friction discs rotating together with the driven shaft, said driving and driven friction discs being wedge-engaged with each other, a first gear fixed to the countershaft and being in mesh with a gear fixed to the input shaft a second gear fixed to the countershaft and being in mesh with a gear fixed to the driving rotary assembly, a third gear fixed to the countershaft and being in mesh with a sun gear rotatably provided on said common axis, planet gears journaled on a planetary carrier fixed to the driven shaft and being in mesh with the sun gear, and an internal gear integrally provided on the output shaft and being in mesh with the planet gears.

* * * * *